(12) United States Patent
Riley et al.

(10) Patent No.: US 6,485,113 B2
(45) Date of Patent: Nov. 26, 2002

(54) HAPTIC BRAKING METHOD AND SYSTEM

(75) Inventors: Hubert B. Riley, Novi, MI (US); George Kuo, South Lyon, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/802,261

(22) Filed: Mar. 8, 2001

(65) Prior Publication Data

US 2002/0125769 A1 Sep. 12, 2002

(51) Int. Cl.[7] .................................................. B60T 8/32
(52) U.S. Cl. ........................ 303/138; 303/155; 303/167; 303/183; 701/78; 701/93; 701/97; 340/453; 340/467
(58) Field of Search ......................... 303/138, 122.02, 303/122.05, 155, 156, 157–159, 167, 183, 191; 701/97, 70, 71, 76, 78, 79, 93; 340/438, 441, 453, 463, 466, 467

(56) References Cited

U.S. PATENT DOCUMENTS

| 5,479,811 A | * | 1/1996 | Baumann et al. ................. 73/2 |
| 5,781,103 A | * | 7/1998 | Gilling ........................ 340/441 |
| 6,185,499 B1 | * | 2/2001 | Kinoshita et al. ............. 701/96 |

* cited by examiner

*Primary Examiner*—Pam Rodriguez
(74) *Attorney, Agent, or Firm*—Scott A. McBain

(57) ABSTRACT

A haptic braking method and system is disclosed. A controller operates a pump to apply brake fluid to a brake when it is necessary to decelerate a wheel during an active cruise control mode of a vehicle. The controller further operates one or more valves to cyclically vary a pressure level of the brake fluid to cause one or more haptic movements of the brake.

24 Claims, 5 Drawing Sheets

HAPTIC BRAKING METHOD AND SYSTEM

BACKGROUND OF THE INVENTION

1. Field of the Invention

The present invention generally relates to control systems for automotive vehicles, and more particularly relates to a haptic braking system of a vehicle in an active cruise control mode.

2. Description of the Related Art

Cruise control systems known in the art enable a driver of a vehicle to set a target vehicle speed. While such systems allow the driver to be less active in driving the vehicle, the driver must be aware of any potential rear end collision with any preceding vehicle. As such, there also exists technology in the art for providing a collision warning to the driver during an active cruise control mode. This technology includes visual indicators, tactile indicators, and audio indicators that are all designed to immediately notify the driver of a potential collision into a rear end of any preceding vehicle. Consequently, the driver has an opportunity to timely utilize a braking system of the vehicle as needed to avoid the collision. Recently, human factor research has indicated that one or more brake pulses may offer a better solution for notifying the driver of the potential collision. The automotive industry is therefore striving to incorporate haptic braking into a cruise control system of an automobile vehicle.

SUMMARY OF THE INVENTION

One form of the present invention is a haptic braking method. First, a signal indicative of a request to decelerate a wheel in a haptic manner is received. Second, brake fluid is applied to a brake adjacent the wheel in response to the signal. Third, a pressure level of the brake fluid is cyclically varied over at least one cycle.

A second form of the present invention is also a haptic braking method. First, a signal indicative of a request to decelerate a wheel in a haptic manner is received. Second, in response to the signal, a pump is operated to apply a brake fluid to a brake adjacent the wheel. Third, a valve is operated to cyclically vary a pressure level of the brake fluid over at least one cycle.

A third form of the present invention is a haptic braking system comprising a controller, a pump, and a valve. The controller is operable to provide control signals in response to a signal indicative of a request to decelerate a wheel in a haptic manner. In response to a first control signal, the pump is operable to apply a brake fluid to a brake adjacent the wheel. In response to a second control signal, the valve is operable to cyclically vary a pressure level of the brake fluid over at least one cycle.

A fourth form of the present invention is also a haptic braking system. The system comprises a means for applying a supply of brake fluid to a brake in response to a signal indicating a request to decelerate a wheel in a haptic manner. The system further comprises a means for cyclically varying a pressure level of the brake fluid over at least one cycle.

The foregoing forms, and other forms, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
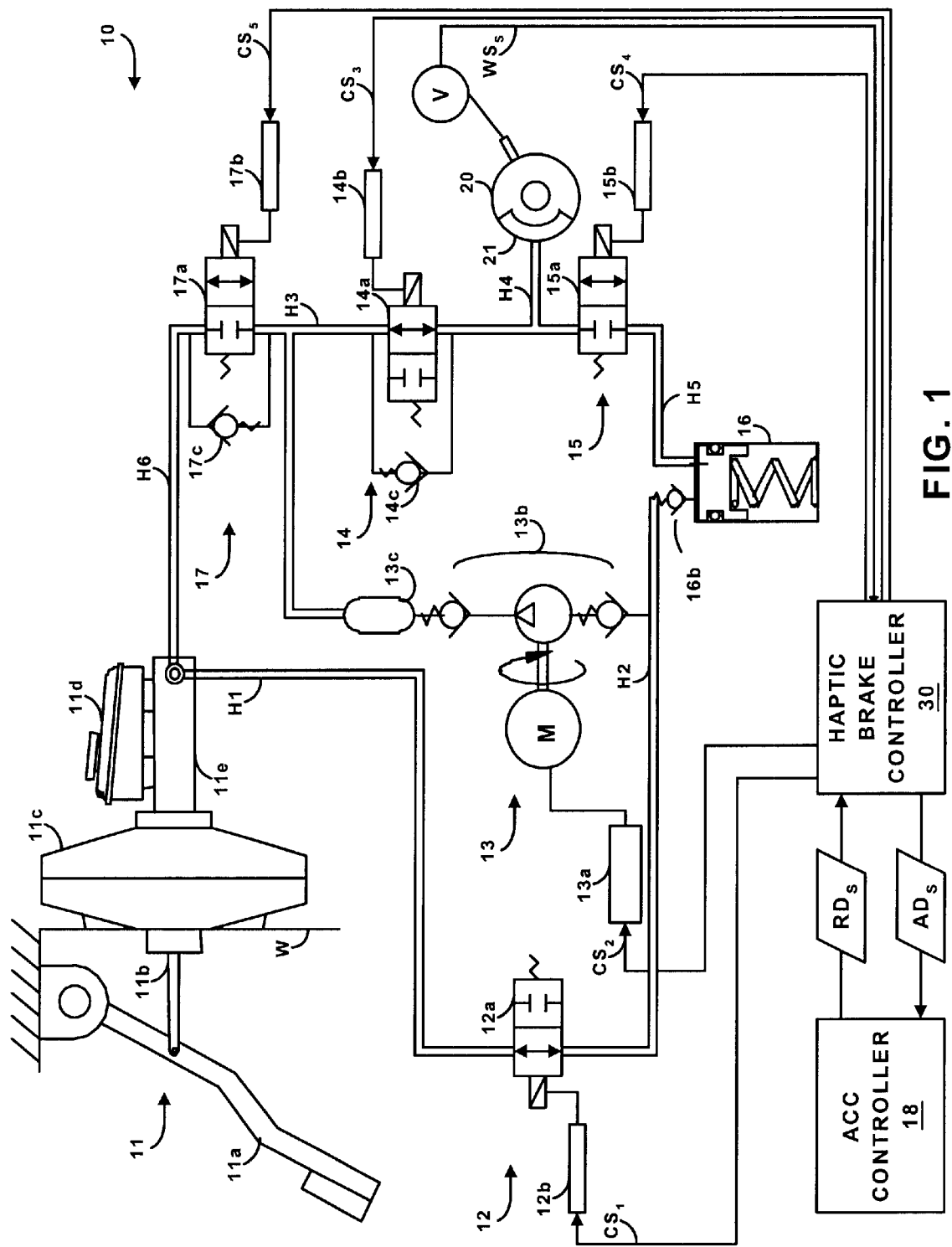
FIG. 1 is a schematic diagram of a braking system known in the art, and one embodiment of a haptic brake controller in accordance with the present invention.

Referring to FIG. 1, a conventional braking system 10 for a wheel 20 and a brake 21 adjacent wheel 20 is shown. System 10 includes a braking assembly 11, a prime valve assembly 12, a brake fluid pump assembly 13, an apply valve assembly 14, a release valve assembly 15, an accumulator 16, and a variable isolation valve assembly 17. Braking assembly 11 has a brake pedal arm 11a rotatably coupled to a wall W of a vehicle. A push rod 11b extends through wall W and is coupled to brake pedal arm 11a and a booster 11c. A pushing of push rod 11b in a direction toward wall W releases brake fluid from brake fluid tank 11d through a primary port of a master cylinder 11e.

Prime valve assembly 12 includes a prime valve 12a spring biased to a fully open position and a solenoid 12b for closing prime valve 12a in response to a control signal in the form of a current signal $CS_1$. A hydraulic line H1 couples the primary port of master cylinder 11e and prime valve 12a.

Brake fluid pump assembly 13 includes a current driver 13a for selectively driving a motor M with piston structure 13b whereby brake fluid from brake fluid tank 11d is pumped throughout braking system 10 in response to control signal in the form of a current signal $CS_2$. A hydraulic line H2 couples prime valve 12a, check valve 16b, and accumulator 16.

Apply valve assembly 14 includes an apply valve 14a spring biased to a fully open position and a solenoid 14b for linearly closing apply valve 14a in response to a control signal in the form of a current signal $CS_3$. A hydraulic line H3 couples damper 13c, apply valve 14a, and an ISO valve 17a of variable valve assembly 17. Release valve assembly 15 includes a release valve 15a spring biased to a closed position and a solenoid 15b for opening release valve 15a in response to a control signal in the form of a current signal $CS_4$. A hydraulic line H4 couples apply valve 14a, release valve 15a, and brake 21. Hydraulic line H5 couples release valve 15a and accumulator 16. A check valve 14c of apply valve assembly 14 prevents brake fluid from flowing from hydraulic line H3 to hydraulic line H4.

Variable isolation valve assembly 17 includes an ISO valve 17a spring normally biased into a fully open position and a solenoid 17b for linearly closing ISO valve 17a in response to a control signal in the form of a current signal $CS_5$. A hydraulic line H6 couples the primary port of master cylinder 11e and ISO valve 17a. A check valve 17c of variable isolation valve assembly 17 prevents brake fluid from flowing from hydraulic line H3 to hydraulic line H6. A haptic brake controller 30 of the present invention implements a haptic braking method of the present invention in response to a request deceleration signal $RD_s$ conventionally provided by an ACC controller 18. As appreciated by those having skill in the art, ACC controller 18 provides request deceleration signal $RD_s$ (in analog or digital form) to controller 30 whenever wheel 20 needs to be decelerated during an active cruise control mode, e.g., a potential rear end collision with a preceding car. The haptic braking method of the present invention comprises three phases. In a pumping-up phase, brake fluid is applied to brake 21 to initiate a deceleration of wheel 20. In a haptic alert phase, a pressure level of the brake fluid being applied to brake 21 is cyclically varied over one or more cycles to cause a haptic braking of wheel 20. In a phase-out phase, brake fluid is drained from hydraulic lines H4→H3→H6.

Controller 30 is preferably an electronic circuit comprised of one or more components that are assembled as a common unit. Alternatively, for the multiple component embodiments, one or more of these components may be distributed throughout a vehicle housing controller 30. Controller 30 may be comprised of digital circuitry, analog circuitry, or both. Also, controller 30 may be programmable, a dedicated state machine, or a hybrid combination of programmable and dedicated hardware. To implement the principals of the present invention, controller 30 can further include any control clocks, interfaces, signal conditioners, filters, Analog-to-Digital (A/D) converters, Digital-to-Analog (D/A) converters, communication ports, or other types of operators as would occur to those having ordinary skill in the art.

In one embodiment, controller 30 includes an integrated processing unit (not shown) operatively coupled to one or more solid-state memory devices (not shown). It is also preferred that this memory contain programming corresponding to a haptic braking routine 40 (FIG. 2) for implementing the haptic braking method of the present invention and that this memory be arranged for reading and writing of data in accordance with the principals of the present invention. The memory may be either volatile or nonvolatile and may additionally or alternatively be of the magnetic or optical variety.

Figure 2:
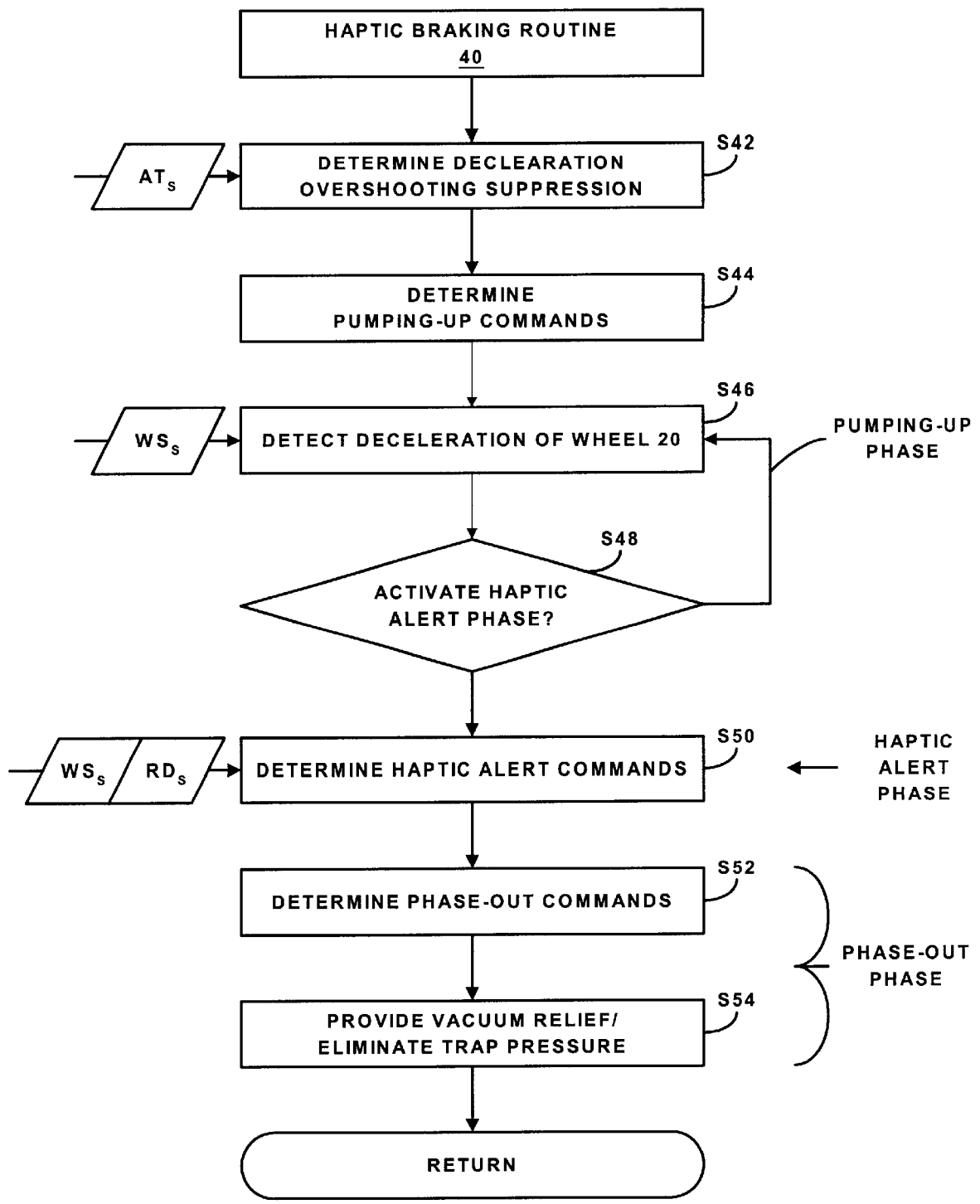
FIG. 2 is a flow diagram of one embodiment of a haptic braking routine in accordance with the present invention.

Referring additionally to FIG. 2, a haptic braking routine 40 in accordance with the present invention is shown. Controller 30 implements routine 40 in response to request deceleration signal $RD_s$. The pumping-up phase of routine 40 encompasses a stage S42, a stage S44, a stage S46, and a stage S48. The haptic alert phase of routine 40 encompasses a stage S50. The phase-out-phase of routine 40 encompasses a stage S52 and a stage S54.

During stage S42 of routine 40, controller 30 inputs an ambient temperature signal $AT_s$ to conventionally determine a deceleration overshooting suppression as appreciated by those having ordinary skill in the art. In one embodiment, controller 30 executes a standard temperature model to determine if a temperature of the brake fluid will exceed a reference temperature when being applied to brake 21. If the temperature model indicates the temperature of the brake fluid will be less than the reference temperature when applied to brake 21, then controller 30 will activate the pumping-up phase and the haptic alert phase for a first standard period of time. For example, if the temperature model indicates the brake fluid will have a temperature that is less than −10° C. when applied to wheel 20, then controller 30 will activate the pumping-up phase and the haptic alert phase for 160 milliseconds. If the temperature model indicates the temperature of the brake fluid will be equal to or greater than the reference temperature when applied to brake 21, then controller 30 will activate the pumping-up phase and the haptic alert phase for a second standard period of time. For example, if the temperature model indicates the brake fluid will have a temperature that is equal to or greater than −10° C. when applied to brake 21, then controller 30 will activate the pumping-up phase and the haptic alert phase for eighty (80) milliseconds.

Figure 3A:
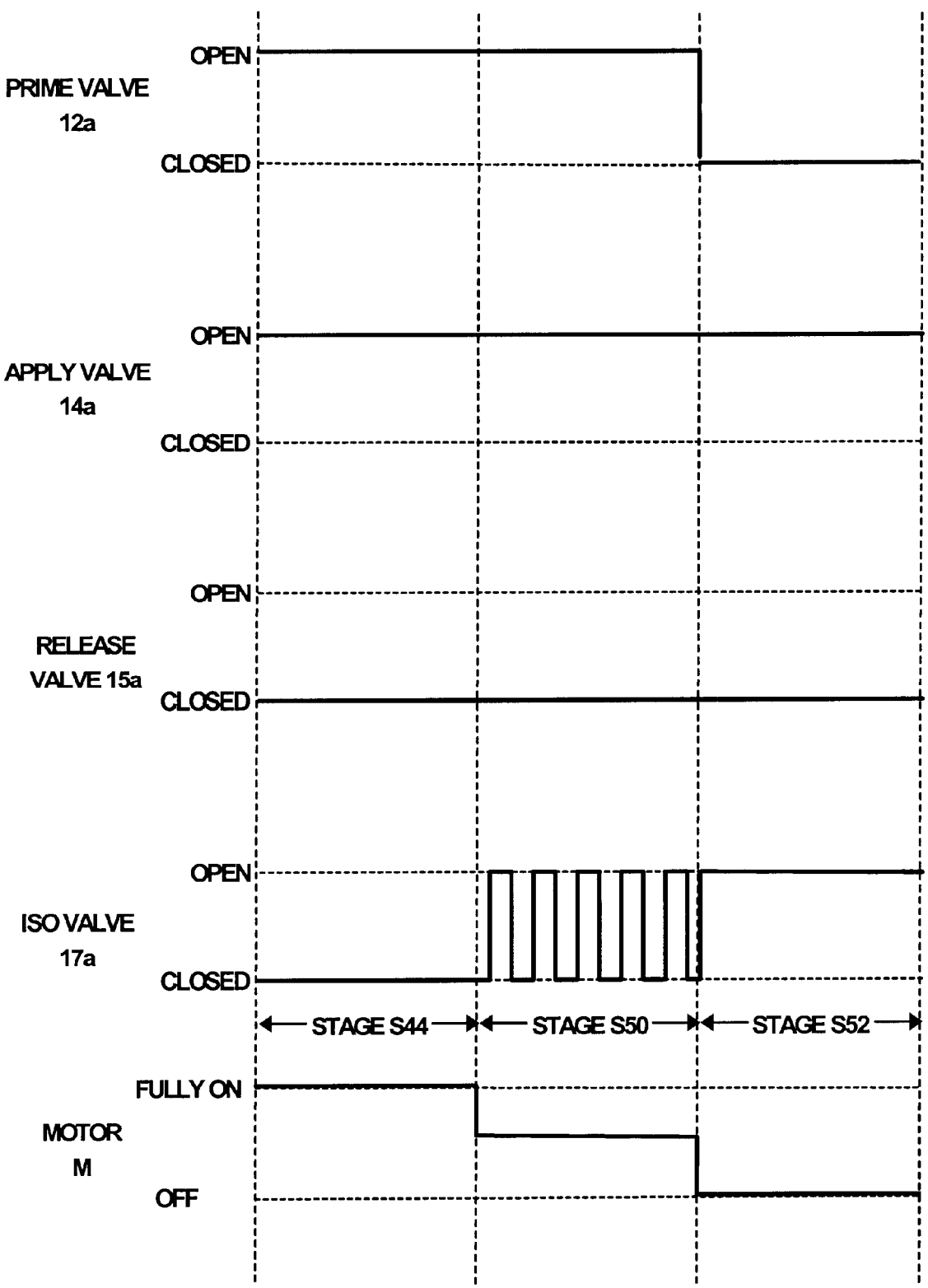
FIG. 3A is an exemplary graphic illustration of operational states of a pump assembly and valve assemblies of the FIG. 1 braking system.

Controller 30 proceeds to stage S44 of routine 40 to determine pumping-up commands for selectively controlling prime valve 12a, motor M, apply valve 14a, release valve 15a, and ISO valve 17a. In one embodiment, controller 30 provides current signal $CS_2$ to current driver 13a to activate motor M whereby brake fluid will be pumped into hydraulic line H4 and applied to brake 21. FIG. 3A illustrates an operating state of prime valve 12a, motor M, apply valve 14a, release valve 15a, and ISO valve 17a during stage S44.

Controller 30 proceeds to stage S46 to monitor the speed of wheel 20 to thereby detect an initial deceleration of wheel 20. In one embodiment, controller 30 receives wheel speed signal $WS_s$ from variable reluctance sensor V to thereby monitor wheel speed signal $WS_s$. During stage S48, controller 30 determines if wheel speed signal $WS_s$ is indicating wheel 20 has experienced a reference level of deceleration. Controller 30 repeats stage S46 and stage S48 until wheel speed signal $WS_s$ is indicating wheel 20 has experienced the reference level of deceleration.

Figure 3B:
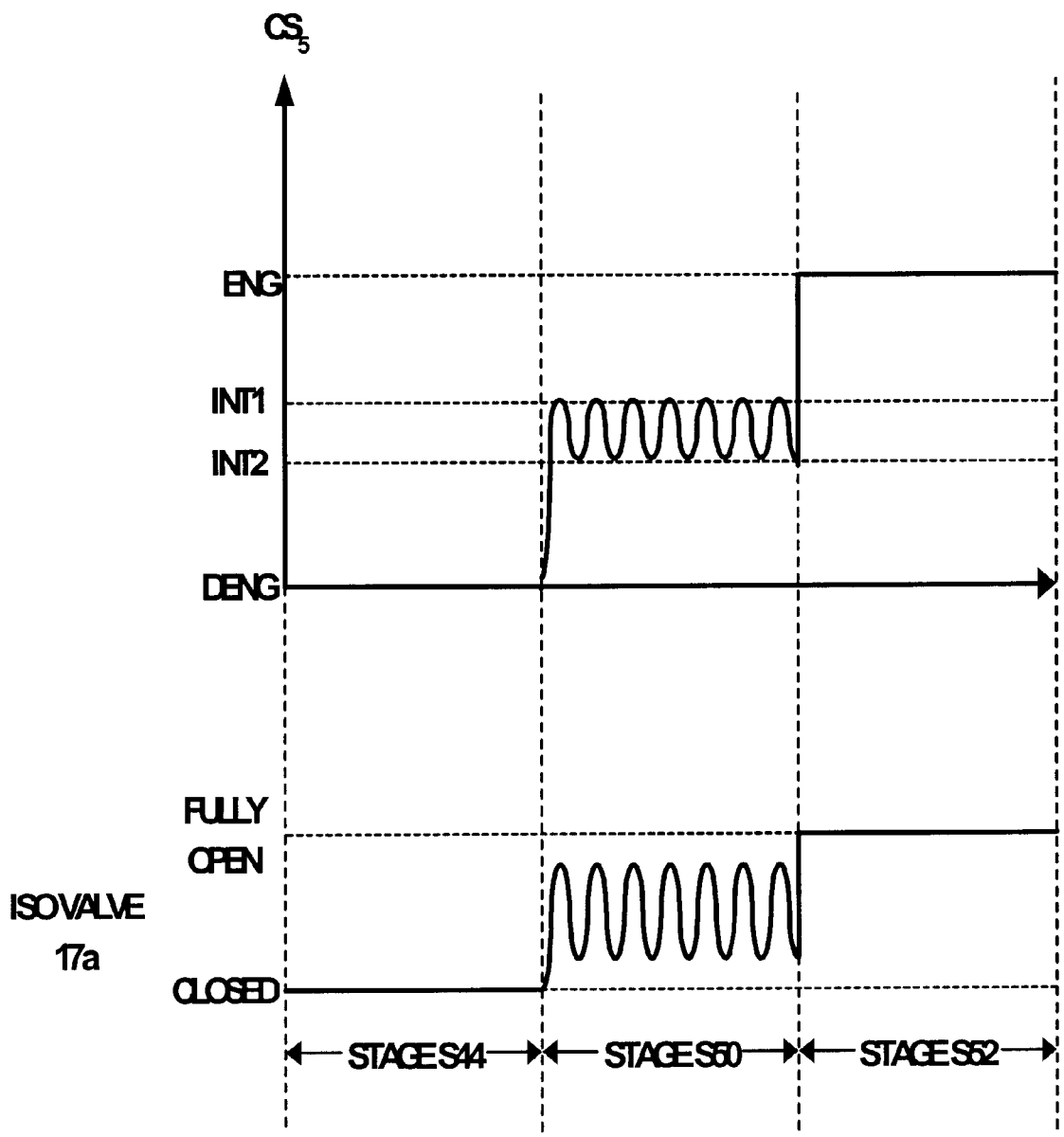
FIG. 3B is an exemplary graphic illustration of a current signal provided to a solenoid of an ISO valve assembly during the FIG. 2 haptic braking routine.

During stage S50 of routine 40, controller 30 determines haptic alert commands for selectively controlling prime valve 12a, motor M, apply valve 14a, release valve 15a, and ISO valve 17a. In one embodiment, controller 30 provides current signal $CS_5$ to ISO solenoid 17b and undulates current signal $CS_5$ between a fully energized level ENG (FIG. 3B) and de-energized level DENG (FIG. 3B). In response thereto, ISO valve 17a undulates between a fully open position and a closed position to cyclically vary the pressure level of the brake fluid within hydraulic line H3 and hydraulic line H4. As a result, wheel 20 experiences one or more haptic movements. Stage S50 is terminated upon the completion of the standard time period determined during stage S42. FIG. 3A illustrates an operating state of prime valve 12a, motor M, apply valve 14a, release valve 15a, and ISO valve 17a during stage S50.

Referring additionally to FIG. 3B, in an another embodiment, controller 30 undulates current signal $CS_5$ between an intermediate energized level INT1 and an intermediate energized level INT2 in order to undulate ISO valve 17a between a first partially open state and a second partially open state. Intermediate energized level INT1 and an intermediate energized level INT2 are utilized in lieu of a fully energized level ENG and de-energized level DENG to minimize wear and tear on a seat of ISO valve 17a.

Figure 4:
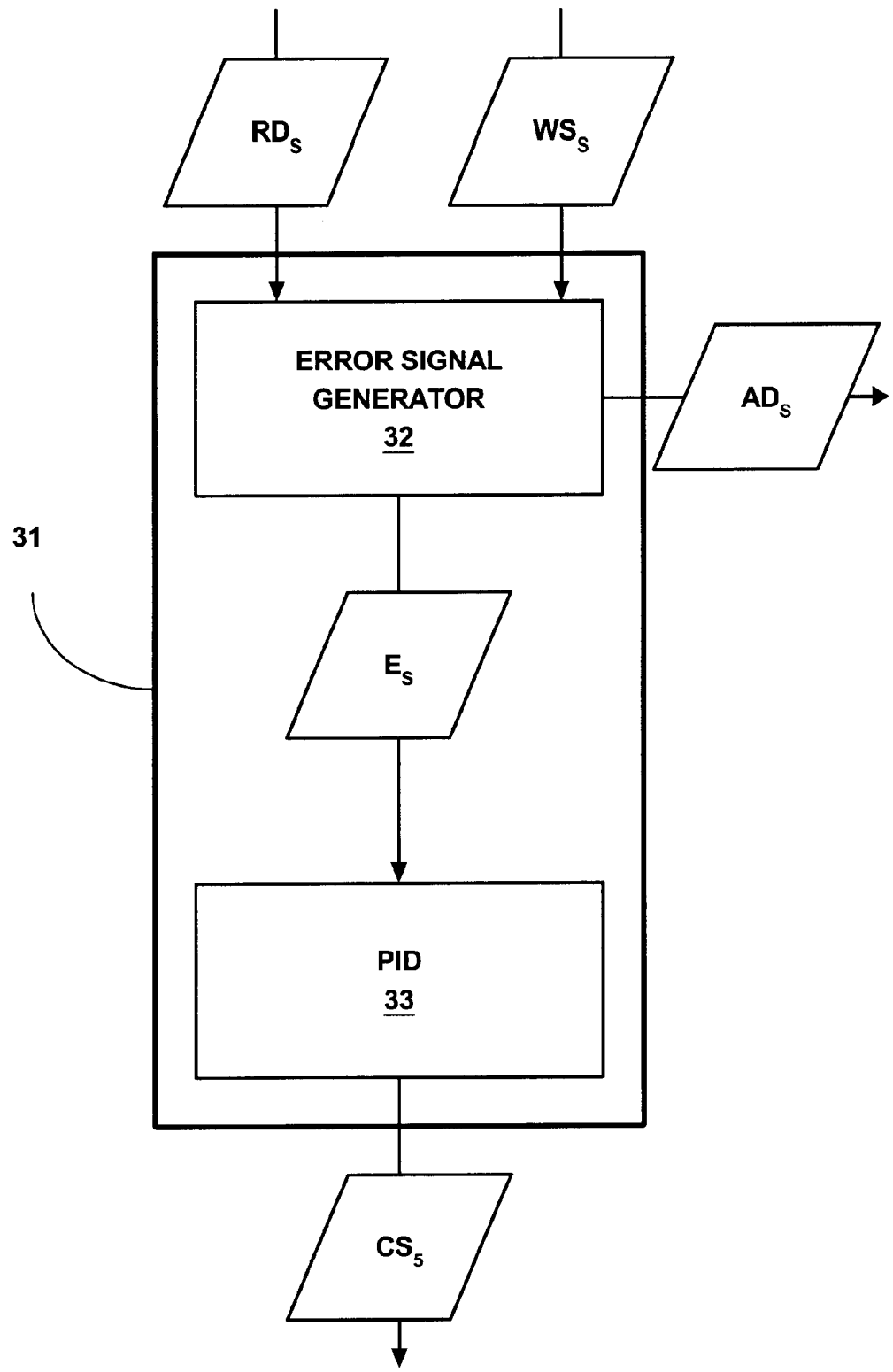
FIG. 4 is a block diagram of one embodiment of a current signal regulator in accordance with the present invention.

"Referring additionally to FIG. 4, a current signal regulator 31 of controller 30 is shown. Regulator 31 includes an error signal generator 32 and a PID 33. During stage S50, generator 32 provides an error signal $E_S$ that is a differential between a level of request deceleration signal $RD_S$ as received from controller 20 and a level of an actual deceleration signal $AD_S$ that is computed as a function of wheel speed signal $WS_S$. Error signal $E_S$ is provided to PID 33, and PID 33 outputs current signal $CS_5$ having duty cycles as a function of error signal $E_S$. As such, the duty cycles of current signal $CS_5$ are dynamically adjusted to thereby dynamically adjust the cyclical variance in the pressure level of the brake fluid. Actual deceleration signal $AD_S$ is provided to controller 20 to enable controller 20 to dynamically adjust the level of request deceleration signal $RD_S$ as needed.

Referring to FIGS. 1 and 2, during stage S52 of routine 40, controller 30 determines haptic phase-out commands for selectively controlling prime valve 12a, motor M, apply valve 14a, release valve 15a, and ISO valve 17a. In one embodiment, controller 30 de-energizes current signal $CS_5$ to ISO solenoid 17b to fully open ISO valve 17a whereby brake fluid flows back to master cylinder 11e. FIG. 3A illustrates an operating state of prime valve 12a, motor M, apply valve 14a, release valve 15a, and ISO valve 17a during stage S52. During stage S54 of routine 40, controller 30 conventionally provides a vacuum relief and elimination of trap pressure from hydraulic lines H1–H5.

System 10 includes additional wheels, brakes, and valve assemblies that were not shown for the simplicity of describing the present invention. However, those having ordinary skill in the art will appreciate that controller 30 can control haptic braking of two or more wheels of system 10.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A haptic braking method for a vehicle having a wheel and a brake adjacent the wheel, comprising:
   receiving a first signal indicative of a request to decelerate the wheel in a haptic manner;
   applying a supply of brake fluid to the brake in response to said first signal; and
   cyclically varying a pressure level of said supply of brake fluid over at least one cycle.

2. The haptic braking method of claim 1, further comprising:
   providing a second signal indicative of a measured deceleration level of the wheel in response to said first signal.

3. The haptic braking method of claim 1, further comprising:
   adjusting said cyclically varying of said pressure level of said brake fluid as a function of a desired deceleration level of the wheel and a speed of the wheel.

4. The haptic braking method of claim 1, further comprising:
   establishing a time interval for said cyclically varying of said pressure level of said brake fluid as a function of a temperature ambient the vehicle.

5. The haptic braking method of claim 1, further comprising:
   receiving a second signal indicative of a deceleration of the wheel to a reference deceleration level,
   wherein said cyclically varying of said pressure level of said brake fluid is commenced in response to said second signal.

6. A haptic braking method for a vehicle having a wheel and a brake adjacent the wheel, comprising:
   receiving a first signal indicative of a request to decelerate the wheel in a haptic manner;
   operating a pump to apply a supply of brake fluid to the brake in response to said first signal; and
   operating a set of at least one valve to cyclically vary a pressure level of said supply of brake fluid over at least one cycle.

7. The haptic braking method of claim 6, further comprising:
   providing a second signal indicative of a measured deceleration level of the wheel in response to said first signal.

8. The haptic braking method of claim 6, further comprising:
   adjusting said operating of said set of at least one valve as a function of a desired deceleration level of the wheel and a speed of the wheel.

9. The haptic braking method of claim 6, further comprising:
   establishing a time interval for said operating of said set of at least one valve as a function of a temperature ambient the vehicle.

10. The haptic braking method of claim 6, further comprising:
    receiving a second signal indicative of a deceleration of the wheel to a reference deceleration level,
    wherein said operating of said set of at least one valve is commenced in response to said second signal.

11. A haptic braking system for a vehicle having a wheel and a brake adjacent the wheel, comprising:
    a controller operable to provide a least one control signal in response a first signal indicative of a request to decelerate the wheel in a haptic manner;
    a pump operable to apply a supply of brake fluid to the brake in response to a first control signal of said at least one control signal; and
    a valve operable to cyclically vary a pressure level of said supply of brake fluid over at least one cycle in response to a second control signal of said at least one control signal.

12. The haptic braking system of claim 11, wherein
    said controller is operable to provide a second signal indicative of a measured deceleration level of the wheel.

13. The haptic braking system of claim 11, wherein
    said controller is further operable to regulate said at least one control signal as a function of a desired deceleration level of the wheel and a speed of the wheel.

14. The haptic braking system of claim 11, wherein
    said controller is further operable to establish a time interval for providing said first control signal and said second control signal as a function of a temperature ambient the vehicle.

15. The haptic braking system of claim 11, wherein
    said controller is further operable to provide said second control signal to said valve in response to a second signal indicating a deceleration of the wheel to a reference deceleration level.

16. A haptic braking system for a vehicle having a wheel and a brake adjacent the wheel, said system comprising:
    a means for applying a supply of brake fluid to the brake in response to a first signal indicative of a request to decelerate the wheel in a haptic manner; and
    a means for cyclically varying a pressure level of said supply of brake fluid over at least one cycle.

17. The haptic braking system of claim 16, further comprising:
    a means for providing a second signal indicative of a measured deceleration level of the wheel.

18. The haptic braking system of claim 16, further comprising:
    a means for adjusting said cyclically varying of said pressure level of said brake fluid as a function of a desired deceleration level of the wheel and a speed of the wheel.

19. The haptic braking system of claim 16, further comprising:

a means for establishing a time interval for said cyclically varying of said pressure level of said brake fluid as a function of a temperature ambient the vehicle.

20. The haptic braking system of claim 16, further comprising:

a means for providing commencing said cyclically varying of said pressure level of said brake fluid in response to a second signal indicating a deceleration of the wheel to a reference deceleration level.

21. A haptic braking method for a vehicle having a wheel and a brake adjacent the wheel, comprising:

receiving a first signal indicative of a request to decelerate the wheel in a haptic manner;

applying a supply of brake fluid to the brake in response to said first signal;

cyclically varying a pressure level of said supply of brake fluid over at least one cycle; and establishing a time interval for said cyclically varying of said pressure level of said brake fluid as a function of a temperature ambient the vehicle.

22. A haptic braking method for a vehicle having a wheel and a brake adjacent the wheel, comprising:

receiving a first signal indicative of a request to decelerate the wheel in a haptic manner;

operating a pump to apply a supply of brake fluid to the brake in response to said first signal;

operating a set of at least one valve to cyclically vary a pressure level of said supply of brake fluid over at least one cycle; and establishing a time interval for said operating of said set of at least one valve as a function of a temperature ambient the vehicle.

23. A haptic braking system for a vehicle having a wheel and a brake adjacent the wheel, comprising:

a controller operable to provide a least one control signal in response a first signal indicative of a request to decelerate the wheel in a haptic manner;

a pump operable to apply a supply of brake fluid to the brake in response to a first control signal of said at least one control signal; and a valve operable to cyclically vary a pressure level of said supply of brake fluid over at least one cycle in response to a second control signal of said at least one control signal; and wherein said controller is further operable to establish a time interval for providing said first control signal and said second control signal as a function of a temperature ambient the vehicle.

24. A haptic braking system for a vehicle having a wheel and a brake adjacent the wheel, said system comprising:

a means for applying a supply of brake fluid to the brake in response to a first signal indicative of a request to decelerate the wheel in a haptic manner;

a means for cyclically varying a pressure level of said supply of brake fluid over at least one cycle; and a means for establishing a time interval for said cyclically varying of said pressure level of said brake fluid as a function of a temperature ambient the vehicle.

* * * * *